(12) United States Patent
Michioka et al.

(10) Patent No.: US 7,819,584 B2
(45) Date of Patent: Oct. 26, 2010

(54) GUIDE APPARATUS

(75) Inventors: Hidekazu Michioka, Tokyo (JP); Daisuke Yatsushiro, Yamanashi (JP); Yoshiaki Saito, Yamanashi (JP)

(73) Assignee: THK Co., Ltd., Tokyo (JP)

( * ) Notice: Subject to any disclaimer, the term of this patent is extended or adjusted under 35 U.S.C. 154(b) by 1056 days.

(21) Appl. No.: 10/574,651

(22) PCT Filed: Oct. 5, 2004

(86) PCT No.: PCT/JP2004/014628

§ 371 (c)(1), (2), (4) Date: Apr. 4, 2006

(87) PCT Pub. No.: WO2005/036002

PCT Pub. Date: Apr. 21, 2005

(65) Prior Publication Data
US 2007/0041671 A1    Feb. 22, 2007

(30) Foreign Application Priority Data
Oct. 7, 2003    (JP) ............................. 2003-348893

(51) Int. Cl.
*F16C 33/00* (2006.01)
*F16C 33/10* (2006.01)
*F16C 29/06* (2006.01)

(52) U.S. Cl. ............................. 384/15; 384/13; 384/45
(58) Field of Classification Search .................. 384/15, 384/45, 13
See application file for complete search history.

(56) References Cited

U.S. PATENT DOCUMENTS 5,360,271 A * 11/1994 Agari .......................... 384/15
(Continued)

FOREIGN PATENT DOCUMENTS

JP    3-118317 U    12/1991
(Continued)

OTHER PUBLICATIONS

International Search Report of International Application PCT/JP2004/014628 mailed Jan. 25, 2005.
(Continued)

*Primary Examiner*—Thomas R Hannon
*Assistant Examiner*—Phillip A Johnson
(74) *Attorney, Agent, or Firm*—Westerman, Hattori, Daniels & Adrian, LLP (57) ABSTRACT

A guide apparatus including a track rail and a moving block is free from the possibility of foreign matter entering the moving block through the gaps between the side surfaces of the track rail and the inner side surfaces of the moving block even in an environment where many fine dust particles are flying.

A guide apparatus has a track rail and a moving block 20 relatively movably attached to the track rail with rolling elements interposed therebetween. The rolling elements recirculate through rolling element recirculation passages. Foreign matter entry preventing plates 34 are provided so that their respective distal ends longitudinally contact the opposite side surfaces of the track rail to close the gaps between the side surfaces of the track rail and at least the inner side surfaces of skirt portions on both sides of a moving block body 21 and the inner side surfaces of end plates of the moving block 20.

7 Claims, 10 Drawing Sheets

U.S. PATENT DOCUMENTS

| | | |
|---|---|---|
| 5,494,354 A | 2/1996 | Tsukada |
| 5,553,944 A * | 9/1996 | Osawa et al. .................. 384/15 |
| 6,290,394 B1 * | 9/2001 | Obara et al. .................. 384/13 |
| 6,877,900 B2 * | 4/2005 | Mochizuki et al. ............ 384/15 |

FOREIGN PATENT DOCUMENTS

| | | |
|---|---|---|
| JP | 1991-118317 | 12/1991 |
| JP | 4-19918 U | 2/1992 |
| JP | 1992-19918 | 2/1992 |
| JP | 1992-124328 | 11/1992 |
| JP | 6-51547 U | 7/1994 |
| JP | 6-51548 U | 7/1994 |
| JP | 1994-51547 | 7/1994 |
| JP | 1994-51548 | 7/1994 |
| JP | 6-346919 A | 12/1994 |
| JP | 9-317764 A | 12/1997 |

OTHER PUBLICATIONS

Japanese Office Action mailed on Apr. 20, 2010 issued in corresponding Japanese Patent Application No. 2003-348893.

* cited by examiner

PRIOR ART

Fig.1

PRIOR ART

Fig.2

PRIOR ART

PRIOR ART

GUIDE APPARATUS

TECHNICAL FIELD

The present invention relates to a guide apparatus having a track rail and a moving block movably attached to the track rail with rolling elements interposed therebetween. More particularly, the present invention relates to a guide apparatus suitable for use in an environment where fine dust particles are flying.

BACKGROUND ART

Figure 1:
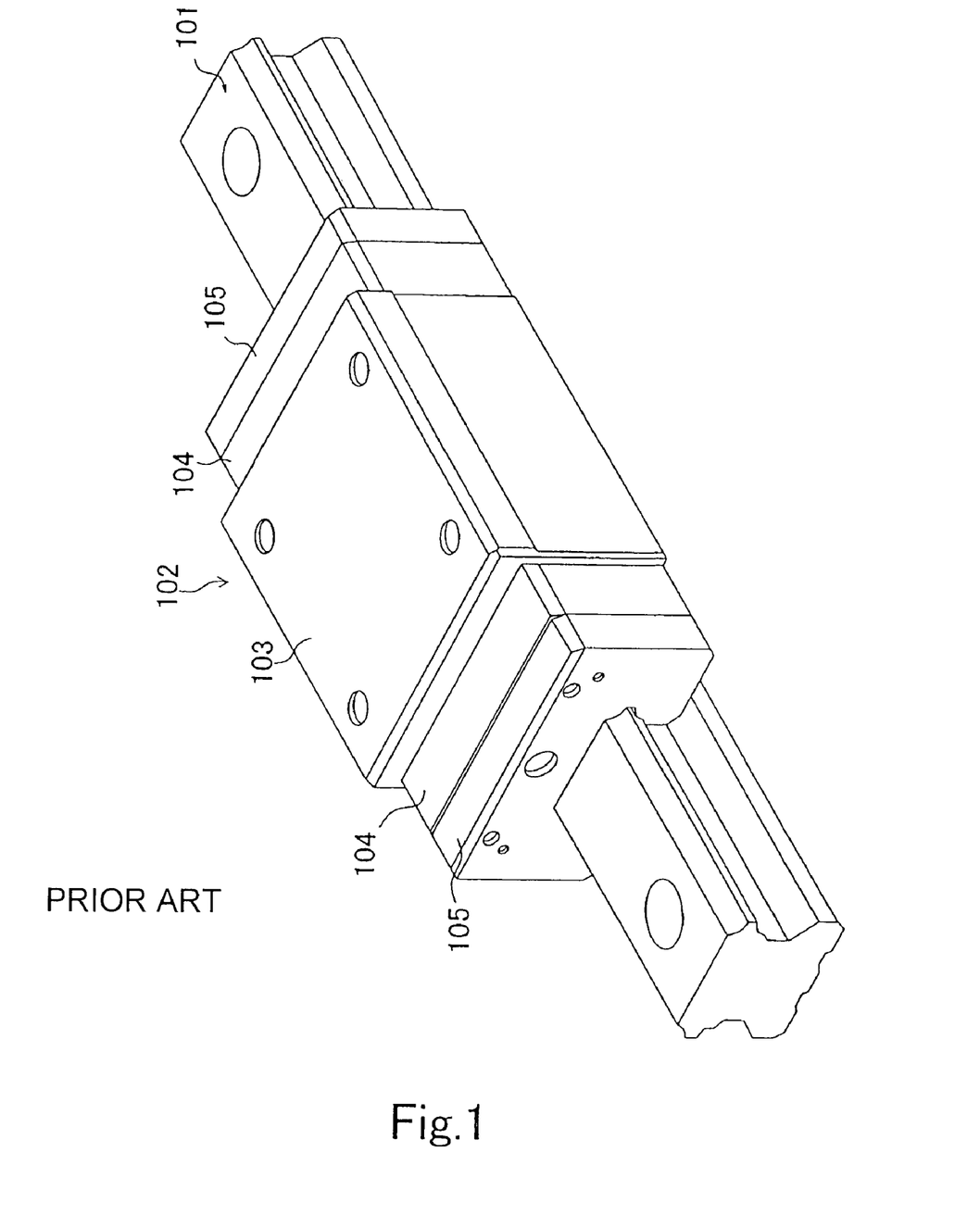
[FIG. 1] is an external perspective view showing a structural example of a guide apparatus.

There is a guide apparatus having, as shown in FIG. 1, a track rail 101 and a moving block 102 relatively movably attached to the track rail 101 with a multiplicity of rolling elements (balls or rollers) interposed therebetween (there are cases where the track rail 101 is fixed, and the moving block 102 is movable, and where the moving block 102 is fixed, and the track rail 101 is movable). In such a guide apparatus, the moving block 102 has a moving block body 103 mounted astride the track rail 101. End plates 104 are mounted astride the track rail 101 and secured to both ends of the moving block body 103 in the direction of relative movement. Seals 105 are mounted astride the track rail 101 and secured to the respective outer ends of the end plates 104 in the relative movement direction.

The seals 105 prevent foreign matter from entering the moving block 102 through the gaps between the side surfaces of the track rail 101 and the inner peripheral surfaces of both ends of the moving block 102. Because the seals 105 are attached to the moving block 102, no or very small amount of foreign matter such as fine particles can enter the moving block 102 in an ordinary environment when the guide apparatus is used in such a manner that the track rail 101 is installed on a horizontal plane and the moving block 102 is attached to the horizontally extending track rail 101.

DISCLOSURE OF THE INVENTION

Problem to be Solved by the Invention

Figure 2:
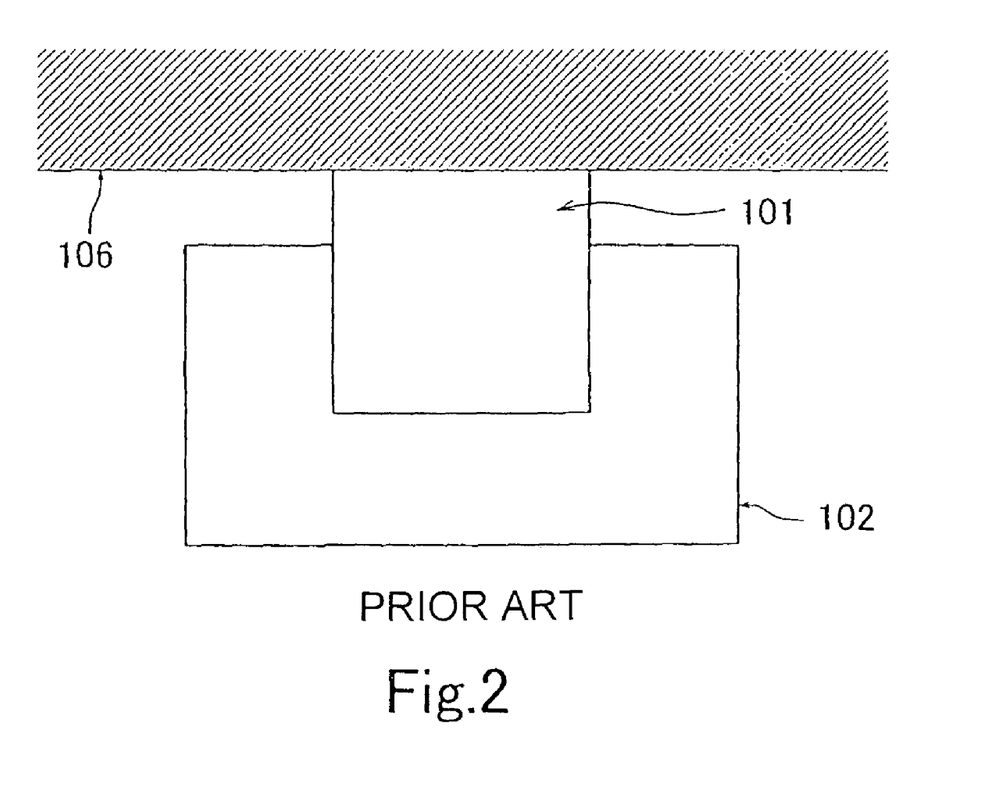
[FIG. 2] is a diagram showing an example of the use position of a guide apparatus.
Figure 3:
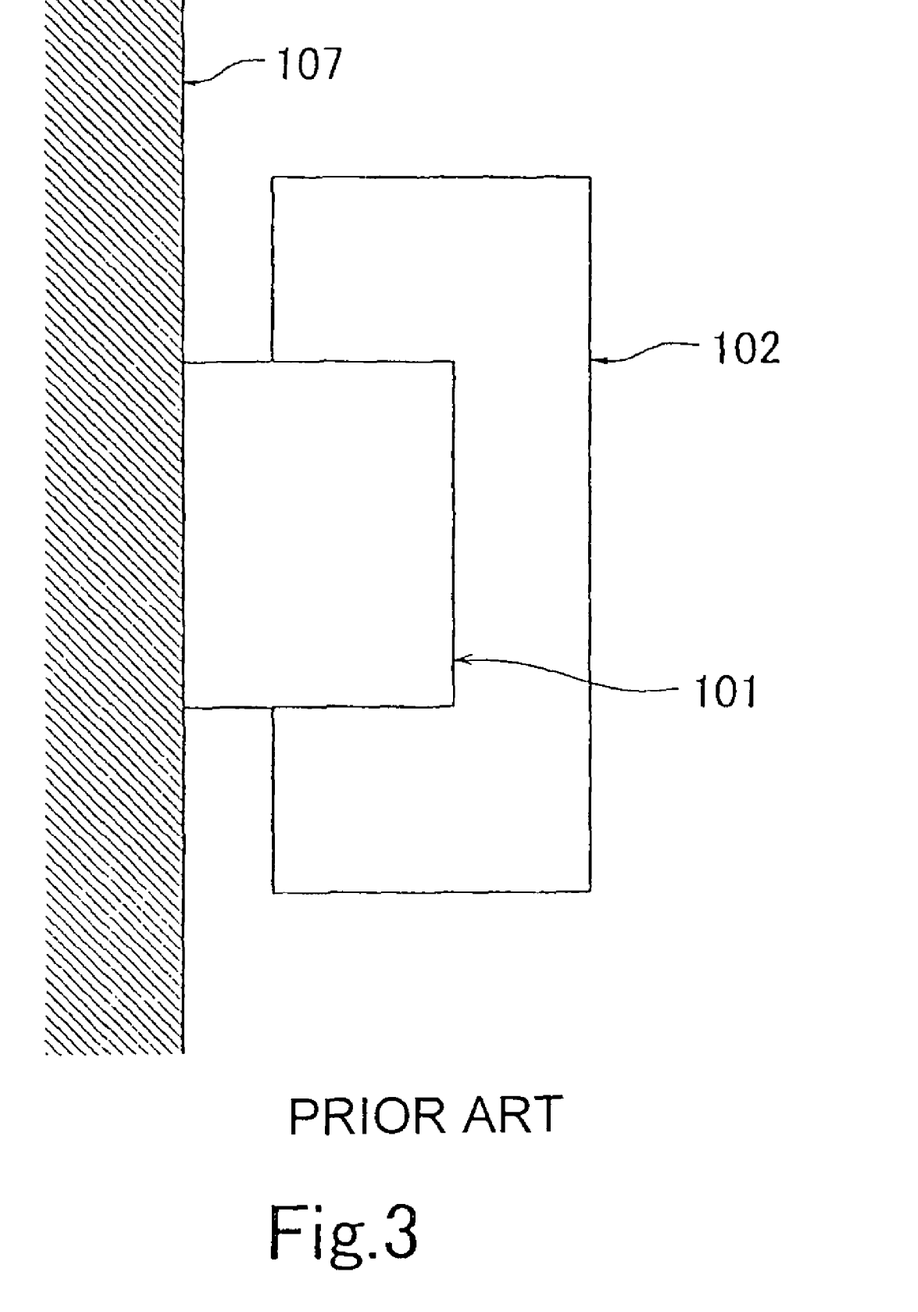
[FIG. 3] is a diagram showing an example of the use position of a guide apparatus.
Figure 4:
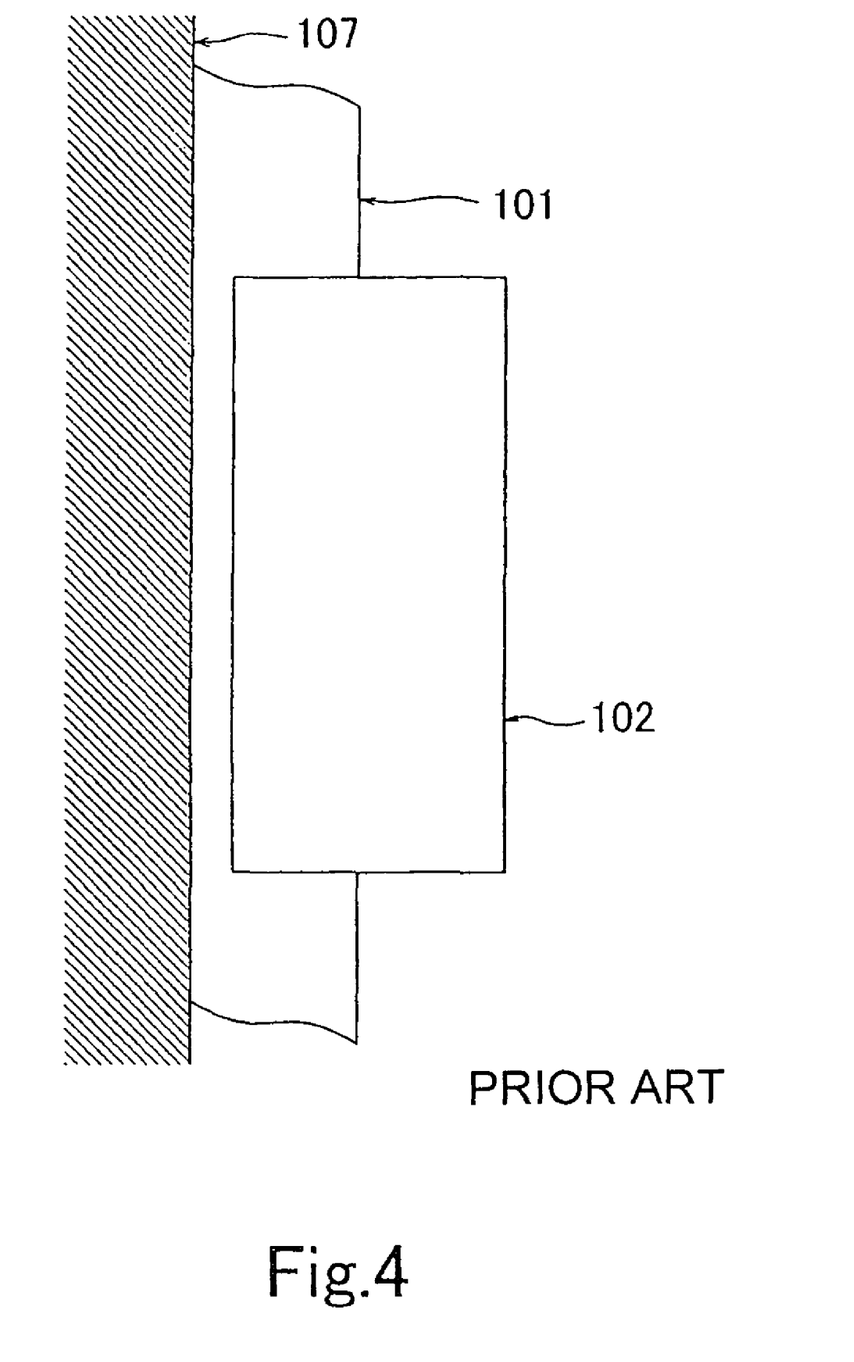
[FIG. 4] is a diagram showing an example of the use position of a guide apparatus.

When the guide apparatus is used in an ordinary environment and in the position as shown in FIG. 1, as stated above, entry of foreign matter into the moving block 102 will not give rise to a serious problem. The guide apparatus, however, may be used in the position shown in FIG. 2, where the track rail 101 is secured to a ceiling surface 106, and the moving block 102 is attached to the track rail 101 on the ceiling surface 106. In other words, the guide apparatus may be used in an inverted position. The guide apparatus may also be used in the position shown in FIG. 3, where the track rail 101 is horizontally secured to a wall surface 107, and the moving block 102 is attached to the horizontally extending track rail 101. That is, the guide apparatus may be used in a wall-hung position. As shown in FIG. 4, the guide apparatus may also be used in a position where the track rail 101 is vertically secured to the wall surface 107, and the moving block 102 is attached to the vertically extending track rail 101. That is, the guide apparatus may be used in a vertical position. When the guide apparatus is used in any of these positions, particularly in an environment containing many dust particles, foreign matter is likely to enter the moving block 102 through the gaps between the side surfaces of the track rail 101 and the inner side surfaces of the moving block 102, thus preventing smooth rolling of the rolling elements (balls or rollers). This may cause a failure.

The present invention was made in view of the above-described circumstances. An object of the present invention is to provide a guide apparatus free from the possibility of foreign matter entering the moving block through the gaps between the side surfaces of the track rail and the inner side surfaces of the moving block even in an environment where many fine dust particles are flying.

Means for Solving the Problem

To attain the above-described object, the present invention provides a guide apparatus including a track rail having rolling element rolling surfaces extending in the longitudinal direction thereof, and a moving block relatively movably attached to the track rail. The moving block has an approximately U-shaped sectional configuration in a plane perpendicular to the longitudinal direction of the track rail. The moving block has skirt portions formed at both sides of the opening thereof and is mounted astride the track rail. The moving block includes a moving block body having load rolling element rolling surfaces that form load rolling element rolling passages in cooperation with the rolling element rolling surfaces. The moving block body further has rolling element relief bores associated with the load rolling element rolling surfaces. The moving block further includes end plates mounted astride the track rail and secured to both ends of the moving block body in the direction of relative movement of the moving block. The end plates each have rolling element direction change passages that form rolling element recirculation passages in cooperation with the load rolling element rolling passages and the rolling element relief bores. A plurality of rolling elements are disposed in the rolling element recirculation passages so as to recirculate in response to relative movement of the track rail and the moving block. The guide apparatus is characterized by including foreign matter entry preventing plates provided so that their respective distal ends longitudinally contact the opposite side surfaces of the track rail to close the gaps between the side surfaces of the track rail and at least the inner side surfaces of the skirt portions on both sides of the moving block body and the inner side surfaces of the end plates.

Thus, the guide apparatus is provided with foreign matter entry preventing plates having their respective distal ends longitudinally contacting the opposite side surfaces of the track rail to close the gaps between the side surfaces of the track rail and at least the inner side surfaces of the skirt portions on both sides of the moving block body and the inner side surfaces of the end plates of the moving block. Therefore, there is no possibility of foreign matter, e.g. fine dust particles, entering through the gaps between the side surfaces of the track rail and the inner side surfaces of the skirt portions on both sides of the moving block body and the inner side surfaces of the end plates. This type of guide apparatus is generally provided with end foreign matter entry preventing devices at both ends of the moving block in the travel direction to prevent entry of foreign matter into the moving block through the gaps between the inner peripheral surfaces of both end portions of the moving block and the outer periphery of the track rail. Therefore, the gaps between the track rail and the moving block are closed by the end foreign matter entry preventing devices and the foreign matter entry preventing plates. Accordingly, it is possible to block foreign matter from entering the moving block substantially completely. Consequently, the plurality of rolling elements disposed in the rolling element recirculation passages of the guide apparatus can perform maintenance-free, smooth rolling for a long period of time.

In addition, the guide apparatus according to the present invention is characterized in that the moving block has a plurality of attachment devices, including lubricators, mounted astride the track rail and secured to the outer ends of the end plates in the direction of relative movement. The foreign matter entry preventing plates also close the gaps between the side surfaces of the track rail and the inner side surfaces of the attachment devices.

Thus, the foreign matter entry preventing plates also close the gaps between the side surfaces of the track rail and the inner side surfaces of the attachment devices. Therefore, it is also possible to block foreign matter from entering the attachment devices.

In addition, the guide apparatus according to the present invention is characterized in that the foreign matter entry preventing plates are secured to the respective end surfaces of the skirt portions on both sides of the moving block body.

Thus, the foreign matter entry preventing plates are secured to the respective end surfaces of the skirt portions on both sides of the moving block body. Therefore, it is possible to install the foreign matter entry preventing plates easily using screws or the like while adjusting the contact pressure with the side surfaces of the track rail.

In addition, the guide apparatus according to the present invention is characterized in that the outermost ones of the plurality of attachment devices are metal scrapers formed from metal plates, and the longitudinal end surfaces of the foreign matter entry preventing plates are secured to the metal scrapers.

Thus, the longitudinal end surfaces of the foreign matter entry preventing plates are secured to the metal scrapers. Therefore, the end portions of the foreign matter entry preventing plates are firmly secured. There is no possibility of the end portions of the foreign matter entry preventing plates vibrating or being displaced. When the gaps between the end surfaces of the two skirt portions of the moving block and the base surface to which the track rail is secured are narrow, the foreign matter entry preventing plates can be installed by inserting them from both end sides of the moving block. Thus, the installation operation is facilitated.

In addition, the guide apparatus according to the present invention is characterized in that the foreign matter entry preventing plates each comprise a plate-shaped foreign matter entry preventing plate casing made of a material of high rigidity, and a plate-shaped foreign matter entry preventing plate body made of a flexible material. The foreign matter entry preventing plate body is fitted to one side end portion of the foreign matter entry preventing plate casing, and one side end surface of the foreign matter entry preventing plate body is brought into contact with one side surface of the track rail.

Thus, the foreign matter entry preventing plates are each formed by fitting a plate-shaped foreign matter entry preventing plate body made of a flexible material to one side end portion of a foreign matter entry preventing plate casing made of a material of high rigidity. Therefore, the foreign matter entry preventing plates are simple in arrangement and easy to install.

In addition, the guide apparatus according to the present invention is characterized in that the foreign matter entry preventing plates each comprise a plate-shaped foreign matter entry preventing plate casing made of a material of high rigidity, a plate-shaped foreign matter entry preventing plate body made of a flexible material, and a foreign matter entry preventing plate retainer made of a material of high rigidity. The foreign matter entry preventing plate casing is secured to the end surface of one of the skirt portions on both sides of the moving block body in a state where one side end surface of the foreign matter entry preventing plate body is brought into contact with one side surface of the track rail and where the foreign matter entry preventing plate body is held between the foreign matter entry preventing plate retainer and the foreign matter entry preventing plate casing.

Thus, the foreign matter entry preventing plates are each installed in such a way that the foreign matter entry preventing plate casing is secured to the end surface of one of the skirt portions on both sides of the moving block body in a state where one side end surface of the foreign matter entry preventing plate body is brought into contact with one side surface of the track rail and where the foreign matter entry preventing plate body is held between the foreign matter entry preventing plate retainer and the foreign matter entry preventing plate casing. Therefore, all the components constituting the foreign matter entry preventing plates have a simple plate-shaped configuration and hence become very easy to machine and less costly.

In addition, the guide apparatus according to the present invention is characterized in that the foreign matter entry preventing plates have their respective side end surfaces perpendicularly contacting the opposite side surfaces of the track rail.

Thus, the foreign matter entry preventing plates have their respective side end surfaces perpendicularly contacting the opposite side surfaces of the track rail. Therefore, entry of foreign matter can be prevented even more effectively.

In addition, the guide apparatus according to the present invention is characterized in that the foreign matter entry preventing plates have self-lubricating capability.

Thus, the foreign matter entry preventing plates have self-lubricating capability. Therefore, even if the side end surface of the foreign matter entry preventing plate body is brought into contact with the track rail side surface at a desired contact pressure, smooth relative movement of the track rail and the guide block is maintained.

BEST MODE FOR CARRYING OUT THE INVENTION

Figure 5:
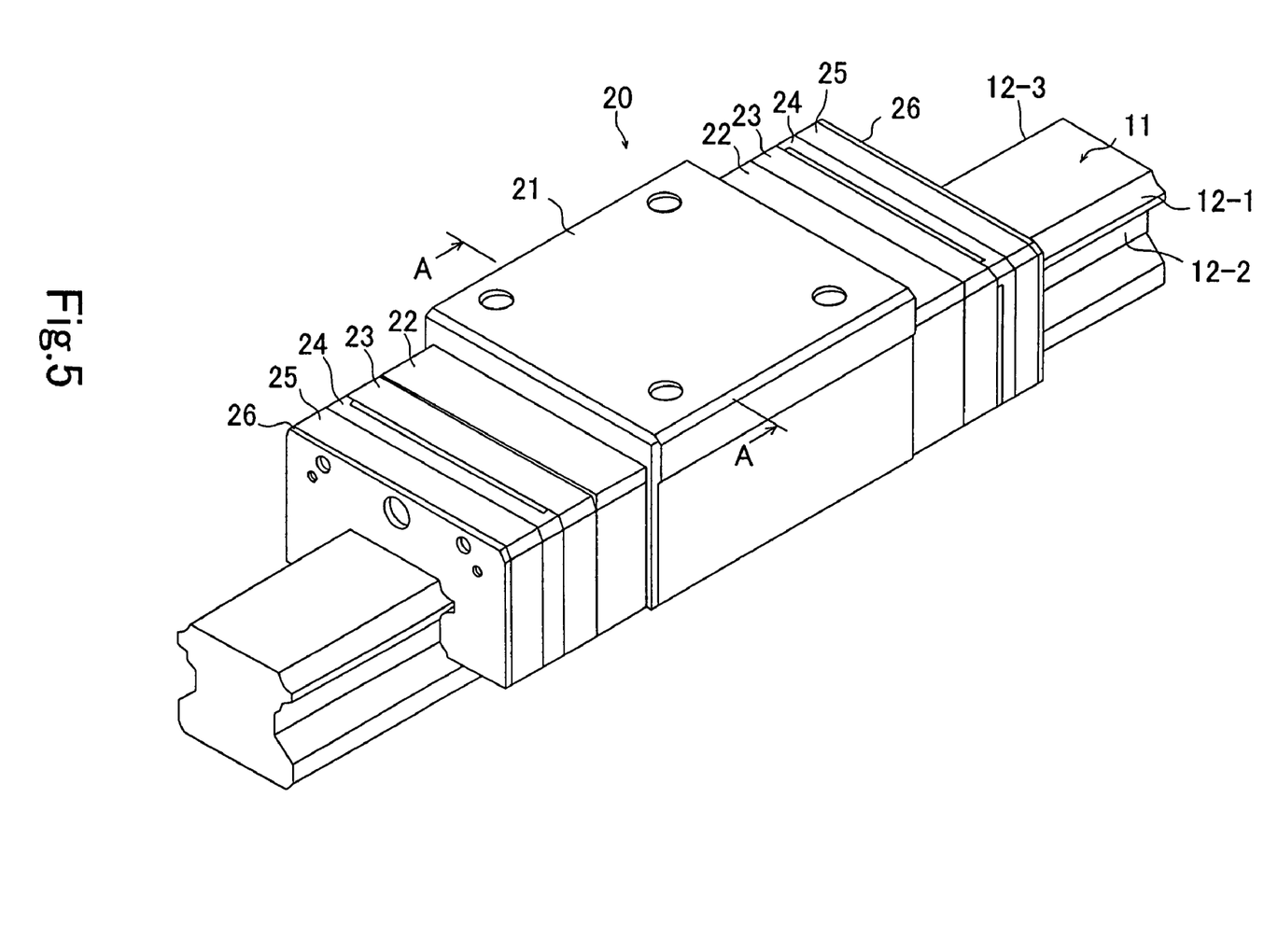
[FIG. 5] is an external perspective view showing a structural example of a guide apparatus according to the present invention.
Figure 6:
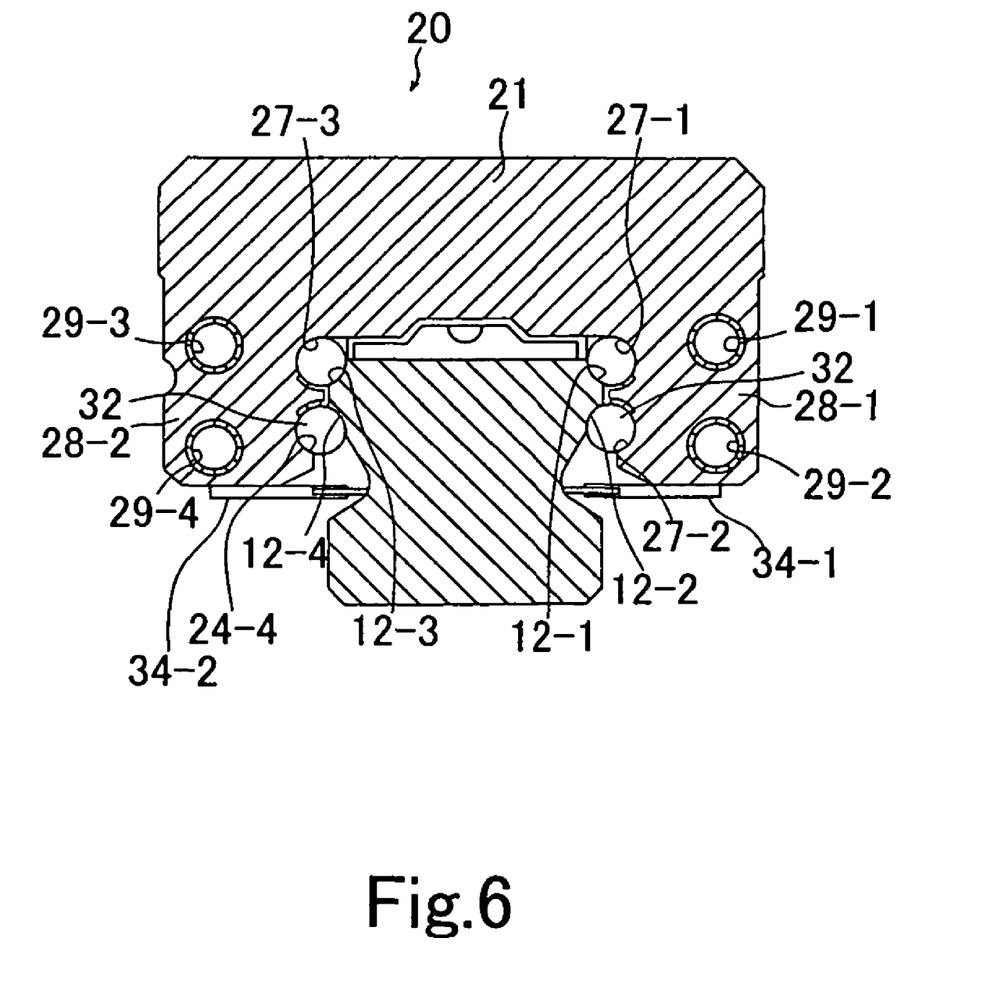
[FIG. 6] is a sectional view as seen in the direction of arrows A-A in FIG. 5.
Figure 7:
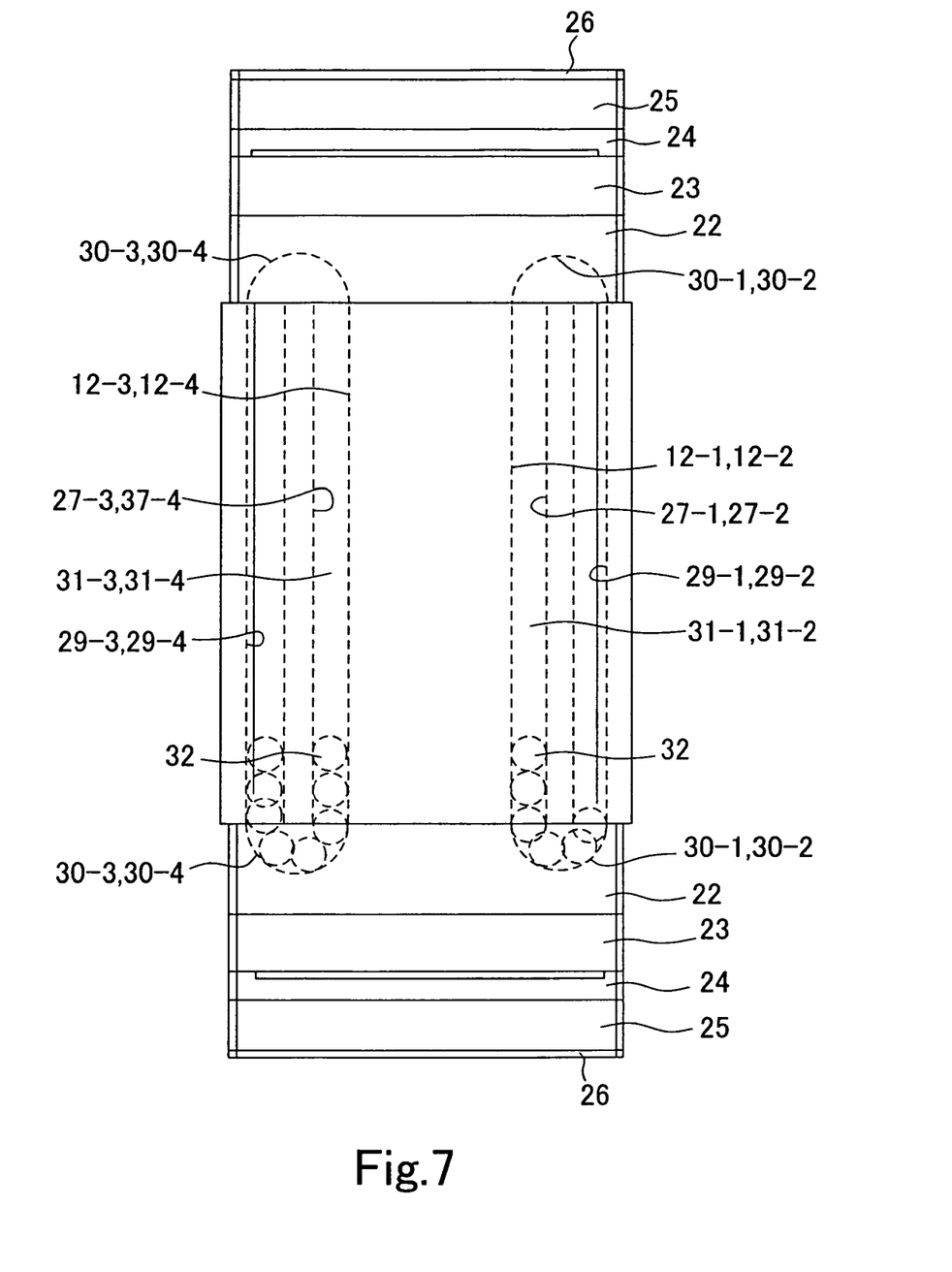
[FIG. 7] is a plan view showing a structural example of a moving block of the guide apparatus according to the present invention.
Figure 8:
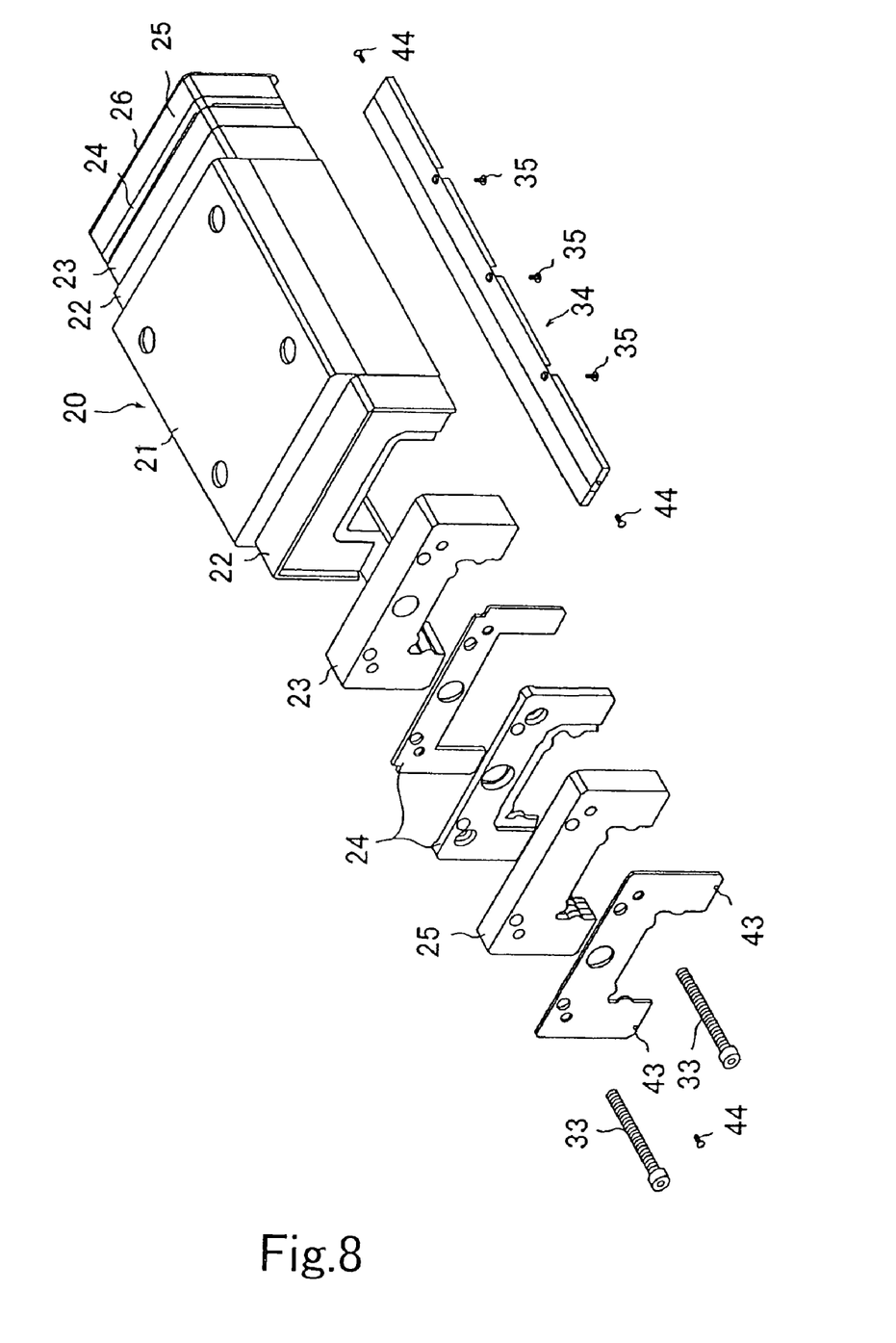
[FIG. 8] is an exploded perspective view of the moving block of the guide apparatus according to the present invention.

An embodiment of the present invention will be explained below with reference to the accompanying drawings. FIGS. 5 to 8 are diagrams showing the arrangement of a guide apparatus according to the present invention, in which: FIG. 5 is an external perspective view; FIG. 6 is a sectional view taken along the line A-A in FIG. 5; FIG. 7 is a plan view of a moving block; and FIG. 8 is an exploded perspective view of the moving block. A track rail 11 is formed with a plurality (four in the illustrated example) of longitudinally extending rolling element rolling grooves 12-1 to 12-4 along which rolling elements (balls) roll.

A moving block 20 is movably attached to the track rail 11. The moving block 20 has a moving block body 21 and end plates 22 secured to both ends of the moving block body 21 in the travel direction of the moving block 20. Lubricators 23 are secured to the respective outer ends of the end plates 22 in the travel direction. End seals 24 are secured to the respective outer ends of the lubricators 23 in the travel direction. Laminated contact scrapers 25 are secured to the respective outer ends of the end seals 24 in the travel direction. Metal scrapers 26 are secured to the respective outer ends of the laminated contact scrapers 25 in the travel direction.

The moving block body 21 has a U-shaped sectional configuration in a plane perpendicular to the longitudinal direction of the track rail 11. The moving block body 21 has skirt portions 28-1 and 28-2 formed at both sides of the opening thereof. The moving block body 21 is mounted astride the track rail 11. The moving block body 21 is formed with a plurality (four in the illustrated example) of load rolling element rolling grooves 27-1 to 27-4 that form load rolling element rolling passages 31-1 to 31-4 in cooperation with the rolling element rolling grooves 12-1 to 12-4 formed on the track rail 11. Further, the moving block body 21 is formed with rolling element relief bores 29-1 to 29-4, the number of which corresponds to the number of load rolling element rolling grooves 27-1 to 27-4.

The end plates 22 have a U-shaped sectional configuration in a plane perpendicular to the longitudinal direction of the track rail 11. The end plates 22 are mounted astride the track rail 11 and secured to both ends of the moving block body 21. The end plates 22 are formed with rolling element direction change passages 30-1 to 30-4, respectively. The rolling element direction change passages 30-1 communicate between the rolling element relief bore 29-1 and the load rolling element rolling passage 31-1, which is formed by the rolling element rolling groove 12-1 of the track rail 11 and the load rolling element rolling groove 27-1 of the moving block body 21, to form a rolling element recirculation passage. The rolling element direction change passages 30-2 communicate between the rolling element relief bore 29-2 and the load rolling element rolling passage 31-2, which is formed by the rolling element rolling groove 12-2 of the track rail 11 and the load rolling element rolling groove 27-2 of the moving block body 21, to form a rolling element recirculation passage. The rolling element direction change passages 30-3 communicate between the rolling element relief bore 29-3 and the load rolling element rolling passage 31-3, which is formed by the rolling element rolling groove 12-3 of the track rail 11 and the load rolling element rolling groove 27-3 of the moving block body 21, to form a rolling element recirculation passage. The rolling element direction change passages 30-4 communicate between the rolling element relief bore 29-4 and the load rolling element rolling passage 31-4, which is formed by the rolling element rolling groove 12-4 of the track rail 11 and the load rolling element rolling groove 27-4 of the moving block body 21, to form a rolling element recirculation passage. Rolling elements (balls) 32 recirculate through the rolling element recirculation passages in response to the relative movement of the track rail 11 and the moving block 20.

The lubricators 23 supply lubricant to the rolling element rolling grooves 12-1 to 12-4 of the track rail 11. The lubricators 23 have a U-shaped sectional configuration in a plane perpendicular to the longitudinal direction of the track rail 11. The lubricators 23 are mounted astride the track rail 11 and secured to the respective outer ends of the end plates 22 in the travel direction. The end seals 24 prevent foreign matter adhering to the surface of the track rail 11 from entering the moving block 20. The end seals 24 have a U-shaped sectional configuration in a plane perpendicular to the longitudinal direction of the track rail 11. The end seals 24 are mounted astride the track rail 11 and secured to the respective outer ends of the lubricators 23 in the travel direction. The inner peripheral surfaces of the end seals 24 are in contact with the surface of the track rail 11.

The laminated contact scrapers 25 prevent minute foreign matter from entering the moving block 20. The laminated contact scrapers 25 have a U-shaped sectional configuration in a plane perpendicular to the longitudinal direction of the track rail 11. Each laminated contact scraper 25 has a plurality of felt-like plate materials laminated in the travel direction within a casing. The laminated contact scrapers 25 are mounted astride the track rail 11 with their inner peripheral surfaces being in contact with the surface of the track rail 11. In this state, the laminated contact scrapers 25 are secured to the respective outer ends of the end seals 24 in the travel direction. The metal scrapers 26 remove relatively large foreign objects such as chips, spatter and dust. The metal scrapers 26 have a U-shaped sectional configuration in a plane perpendicular to the longitudinal direction of the track rail 11. The metal scrapers 26 are mounted astride the track rail 11 with their inner peripheral surfaces being out of contact with the surface of the track rail 11. In this state, the metal scrapers 26 are secured to the respective outer ends of the laminated contact scrapers 25 in the travel direction.

The end plates 22, the lubricators 23, the end seals 24, the laminated contact scrapers 25 and the metal scrapers 26 are stacked, respectively, and, in this state, secured to both ends of the moving block body 21 with screws 33.

Foreign matter entry preventing plates 34 are secured to the respective lower end surfaces of the skirt portions 28-1 and 28-2 (see FIG. 6) of the moving block body 21 with screws 35. The respective distal end surfaces of the foreign matter entry preventing plates 34 longitudinally contact the opposite side surfaces of the track rail 11 to close the gaps between the inner side surfaces of the moving block 20 and the side surfaces of the track rail 11, thereby preventing foreign matter such as fine dust particles from entering the inside through the gaps.

Figures 9A, 9B:
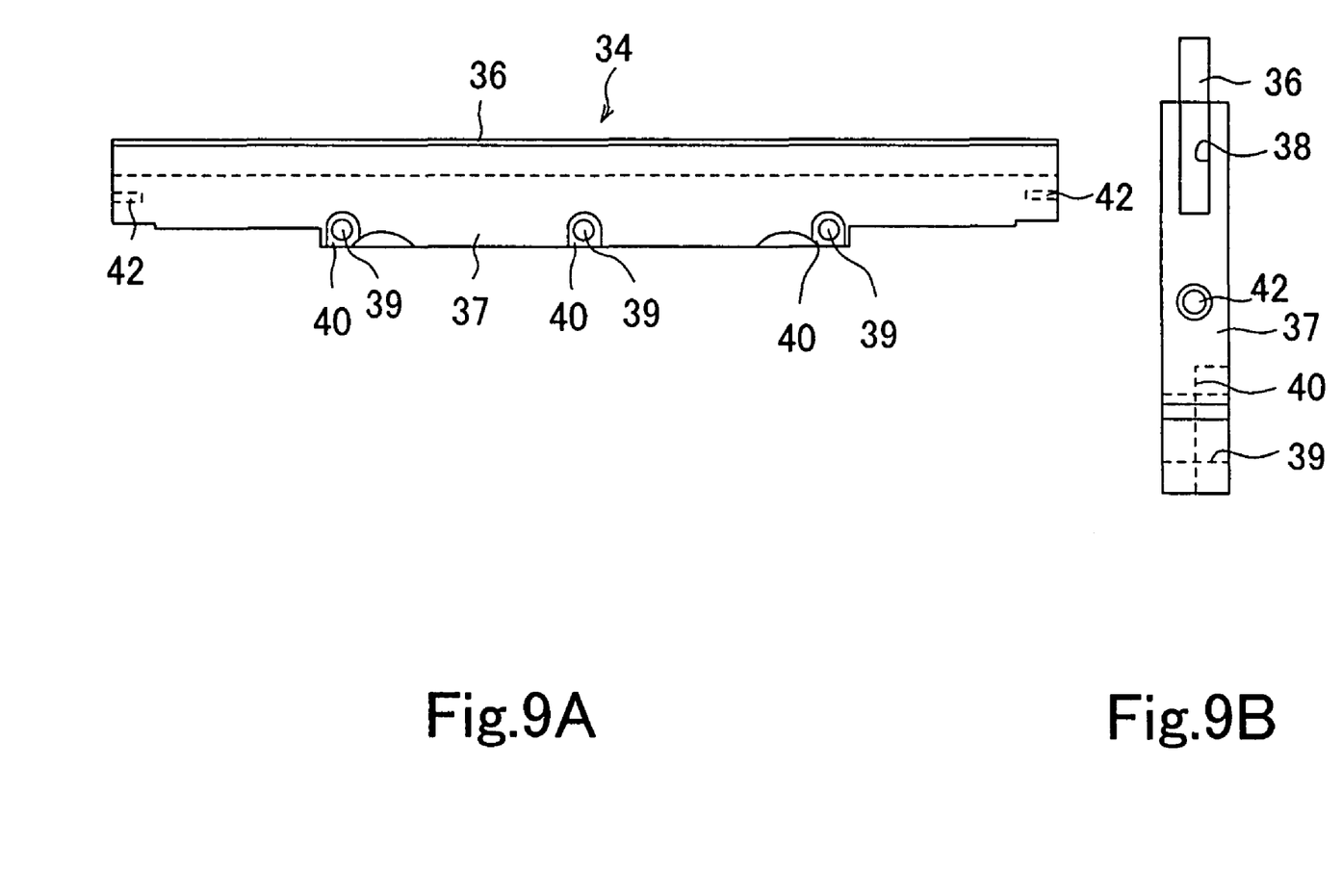
[FIG. 9] is a diagram showing a structural example of a foreign matter entry preventing plate of the guide apparatus according to the present invention.

FIG. 9 is a diagram showing a structural example of the foreign matter entry preventing plates. FIG. 9A is a plan view, and FIG. 9B is an enlarged end side view. Each foreign matter entry preventing plate 34 comprises a foreign matter entry preventing plate body 36 and a foreign matter entry preventing plate casing 37. The foreign matter entry preventing plate body 36 is a plate-shaped member of continuous length made of a flexible resin material (e.g. urethane pad) or the like. The foreign matter entry preventing plate casing 37 is a plate-shaped member made of a material of high rigidity, e.g. a resin or metal material, and has a U-shaped groove 38 formed in one side end surface thereof. One side end portion of the foreign matter entry preventing plate body 36 is insertable into the U-shaped groove 38. A plurality (three in the illustrated example) of U-shaped grooves 40 for forming screw holes 39 are formed in one surface of the other side end portion of the foreign matter entry preventing plate casing 37. Elliptic screw holes 39 are formed in the respective centers of the U-shaped grooves 40. Screw holes 42 are also formed in both end surfaces of the foreign matter entry preventing plate casing 37. The U-shaped grooves 40 each have such a depth that the head of a screw 35 will not project from the surface of the foreign matter entry preventing plate casing 37 when the screw 35 is inserted into the associated screw hole 39.

One side end portion of the foreign matter entry preventing plate body 36 is inserted into the U-shaped groove 38 of the foreign matter entry preventing plate casing 37 and bonded with an adhesive, thereby fitting the foreign matter entry preventing plate body 36 to the foreign matter entry preventing plate casing 37. The foreign matter entry preventing plate body 36 arranged as stated above is secured to the end surface of one of the skirt portions 28-1 and 28-2 on both sides of the moving block body 21 with screws 35 (see FIG. 8) inserted into the screw holes 39. The foreign matter entry preventing plate body 36 extends perpendicular to one side surface of the track rail 11, and one side end surface thereof is in contact with the side surface of the track rail 11 (see FIG. 6). At this time, the contact pressure of the one side end surface of the foreign matter entry preventing plate body 36 can be adjusted because the screw holes 39 are elliptical. More specifically, with the screws 35 untightened, the foreign matter entry preventing plate casing 37 is pressed toward the track rail 11, and after the pressing force has been adjusted, the screws 35 are tightened.

The foreign matter entry preventing plates 34 have such a length that they fit between the metal scrapers 26 at both ends of the moving block 20. Screws 44 are inserted into respective screw holes 43 (see FIG. 8) formed in the metal scrapers 26, and the distal end portions of the screws 44 are screwed into the screw holes 42 on the end surfaces of the foreign matter entry preventing plate casings 37 to secure the end surfaces of the foreign matter entry preventing plates 34 to the side surfaces of the metal scrapers 26. With this arrangement, there is no possibility of the end portions of the foreign matter entry preventing plates 34 vibrating or being displaced. When it is difficult to secure the foreign matter entry preventing plates 34 to the end surfaces of the skirt portions 28-1 and 28-2 on both sides of the moving block body 21 because the gaps between the end surfaces (lower end surfaces in FIG. 6) and the base surface to which the track rail 11 is secured are small, the foreign matter entry preventing plates 34 can be installed by inserting them between the metal scrapers 26 and securing the foreign matter entry preventing plates 34 to the metal scrapers 26 with the screws 44 from both end surface sides of the moving block 20. The foreign matter entry preventing plate body 36 is formed by using a material impregnable with lubricant, e.g. urethane foam, and impregnating it with lubricant, thereby allowing the foreign matter entry preventing plate body 36 to have self-lubricating capability.

The foreign matter entry preventing plates 34 are arranged as stated above to close the gaps between the side surfaces of the track rail 11 and the inner side surfaces of the moving block 20, which comprises the moving block body 21, the end plates 22, the lubricators 23, the end seals 24, the laminated contact scrapers 25 and the metal scrapers 26, except the metal scrapers 26, which are attachment devices. Therefore, there is also no possibility of foreign matter entering the attachment devices, i.e. the lubricators 23, the end seals 24, and the laminated contact scrapers 25. Moreover, the end seals 24 and the laminated contact scrapers 25 prevent foreign matter from entering the moving block body 21 through the end portions thereof. Therefore, entry of foreign matter into the moving block 20 can be blocked substantially perfectly.

The guide apparatus arranged as stated above is suitable for use in machines used in an environment where dust particles are flying, e.g. wood working machines in which wood chips or shavings are generated, cutting machines where plaster dust is generated, grinding machines where grinding dust is generated, carpet cutting machines where fabric dust is generated, cleaning machines handling water and chemicals, machine tools where coolant is generated, and various outdoor machines where dust is generated.

Figures 10A, 10B:
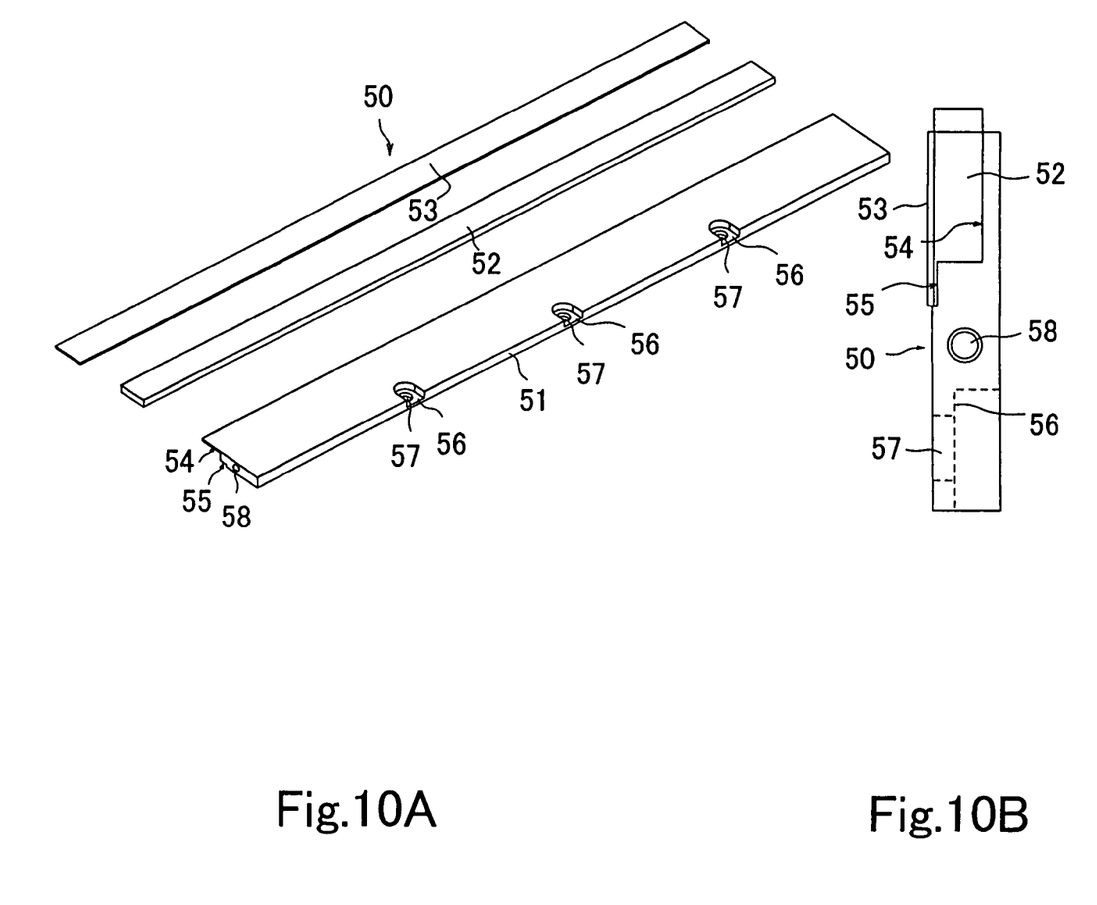
[FIG. 10] is a diagram showing another structural example of a foreign matter entry preventing plate of the guide apparatus according to the present invention.

FIG. 10 is a diagram showing another structural example of the foreign matter entry preventing plates. FIG. 10A is an exploded perspective view, and FIG. 10B is an enlarged end side view. A foreign matter entry preventing plate 50 comprises a foreign matter entry preventing plate casing 51, a foreign matter entry preventing plate body 52, and a foreign matter entry preventing plate retainer 53. The foreign matter entry preventing plate casing 51 is made of a material of high rigidity, e.g. a resin or metal material. The foreign matter entry preventing plate casing 51 has stepped portions 54 and 55 formed in one surface of one side end portion thereof. The stepped portion 54 accommodates one side portion of the foreign matter entry preventing plate body 52. The stepped portion 55 accommodates one side portion of the foreign matter entry preventing plate retainer 53. A plurality (three in the illustrated example) of U-shaped grooves 56 for forming screw holes 57 are formed in one surface of the other side end portion of the foreign matter entry preventing plate casing 51 (i.e. the surface opposite to the surface formed with the stepped portions 54 and 55). Screw holes 57 are formed in the respective centers of the U-shaped grooves 56. Screw holes 58 are also formed in both end surfaces of the foreign matter entry preventing plate casing 51. The U-shaped grooves 56 have such a depth that the head of a screw 35 (see FIG. 8) will not project from the surface of the foreign matter entry preventing plate casing 51 when the screw 35 is inserted into the associated screw hole 57.

The foreign matter entry preventing plate body 52 is a plate-shaped member of continuous length made of a flexible resin material (e.g. urethane pad) or the like. The foreign matter entry preventing plate retainer 53 is made of a material of high rigidity, e.g. a resin or metal material. As shown in FIG. 10B, one side portion of the foreign matter entry preventing plate body 52 is accommodated in the stepped portion 54 of the foreign matter entry preventing plate casing 51, and one side portion of the foreign matter entry preventing plate retainer 53 is accommodated in the stepped portion 55 of the foreign matter entry preventing plate casing 51, thereby holding the foreign matter entry preventing plate body 52 between the foreign matter entry preventing plate casing 51 and the foreign matter entry preventing plate retainer 53. The foreign matter entry preventing plate body 52 is positioned to extend perpendicular to one side surface of the track rail 11, and one side end surface thereof is brought into contact with the side surface of the track rail 11. In this state, the foreign matter entry preventing plate casing 51 is secured to the end surface of one of the skirt portions 28-1 and 28-2 on both sides of the moving block body 21 with screws 35 inserted into the screw holes 57. The foreign matter entry preventing plate body 52 is formed by using a material impregnable with lubricant, e.g. urethane foam, and impregnating it with lubricant, thereby allowing the foreign matter entry preventing plate body 36 to have self-lubricating capability. The foreign matter entry preventing plate body 52 and the foreign matter entry preventing plate casing 51 are bonded together with an adhesive, and the foreign matter entry preventing plate body 52 and the foreign matter entry preventing plate retainer 53 are also bonded together with an adhesive. Screws 44 are inserted into the respective screw holes 43, which are formed in the metal scrapers 26, and screwed into the screw holes 58 on the end surfaces of the foreign matter entry preventing plate casings 51 to secure the end surfaces of the foreign matter entry preventing plates 50 to the side surfaces of the metal scrapers 26.

With the above-described arrangement, the components constituting the foreign matter entry preventing plate 50, i.e. the foreign matter entry preventing plate casing 51, the foreign matter entry preventing plate body 52, and the foreign matter entry preventing plate retainer 53, each have a plate-shaped configuration and hence become easy to machine. Particularly, it becomes unnecessary to perform machining to form the U-shaped groove 38 as provided in the foreign matter entry preventing plate casing 37 of thin wall thickness, shown in FIG. 9, for inserting one side end portion of the foreign matter entry preventing plate body 36. Therefore, machining of the components becomes very easy, and costs are reduced. It should be noted that the operation and effect of the foreign matter entry preventing plate 50 are substantially the same as those of the foreign matter entry preventing plate 34 arranged as shown in FIG. 9.

The present invention is not necessarily limited to the above-described embodiments but can be modified in a variety of ways. For example, although the balls 32 are used as the rolling elements in the foregoing embodiments, the rolling elements are not necessarily limited to balls but may be rollers. Further, in the guide apparatus of the above-described embodiments, the track rail 11 is fixed, and the moving block 20 is movable. The arrangement may, however, be such that the moving block 20 is fixed, and the track rail 11 is movable. Regarding the use position also, the guide apparatus can be used in any position, e.g. an inverted, wall-hung or vertical position as shown in FIGS. 2 to 4, besides the above-mentioned position.

INDUSTRIAL APPLICABILITY

As has been stated above, the present invention is a guide apparatus including a track rail having rolling element rolling surfaces extending in the longitudinal direction thereof, and a moving block relatively movably attached to the track rail. The moving block has an approximately U-shaped sectional configuration in a plane perpendicular to the longitudinal direction of the track rail. The moving block has skirt portions formed at both sides of the opening thereof and is mounted astride the track rail. The moving block includes a moving block body having load rolling element rolling surfaces that form load rolling element rolling passages in cooperation with the rolling element rolling surfaces. The moving block body further has rolling element relief bores associated with the load rolling element rolling surfaces. The moving block further includes end plates mounted astride the track rail and secured to both ends of the moving block body in the direction of relative movement of the moving block. The end plates each have rolling element direction change passages that form rolling element recirculation passages in cooperation with the load rolling element rolling passages and the rolling element relief bores. A plurality of rolling elements are disposed in the rolling element recirculation passages so as to recirculate in response to relative movement of the track rail and the moving block. The guide apparatus is provided with foreign matter entry preventing plates having their respective distal ends longitudinally contacting the opposite side surfaces of the track rail to close the gaps between the side surfaces of the track rail and at least the inner side surfaces of the skirt portions on both sides of the moving block body and the inner side surfaces of the end plates. Therefore, there is no possibility of foreign matter, e.g. fine dust particles, entering through the gaps between the side surfaces of the track rail and the inner side surfaces of the skirt portions on both sides of the moving block body and the inner side surfaces of the end plates. This type of guide apparatus is generally provided with end foreign matter entry preventing devices at both ends of the moving block in the travel direction to prevent entry of foreign matter into the moving block through the gaps between the inner peripheral surfaces of both end portions of the moving block and the outer periphery of the track rail. Therefore, the gaps between the track rail and the moving block are closed by the end foreign matter entry preventing devices and the foreign matter entry preventing plates. Accordingly, it is possible to block foreign matter from entering the moving block substantially completely. Consequently, the plurality of rolling elements disposed in the rolling element recirculation passages of the guide apparatus can perform maintenance-free, smooth rolling for a long period of time.

In the guide apparatus arranged as stated above, the moving block has a plurality of attachment devices, including lubricators, mounted astride the track rail and secured to the outer ends of the end plates in the direction of relative movement. The foreign matter entry preventing plates also close the gaps between the side surfaces of the track rail and the inner side surfaces of the attachment devices. Therefore, it is also possible to block foreign matter from entering the attachment devices.

In the guide apparatus arranged as stated above, the foreign matter entry preventing plates are secured to the respective end surfaces of the skirt portions on both sides of the moving block body. Therefore, it is possible to install the foreign matter entry preventing plates easily using screws or the like while adjusting the contact pressure with the side surfaces of the track rail.

In the guide apparatus arranged as stated above, the outermost ones of the plurality of attachment devices are metal scrapers formed from metal plates, and the longitudinal end surfaces of the foreign matter entry preventing plates are secured to the metal scrapers. Therefore, the end portions of the foreign matter entry preventing plates are firmly secured. There is no possibility of the end portions of the foreign matter entry preventing plates vibrating or being displaced. When the gaps between the end surfaces of the two skirt portions of the moving block and the base surface to which the track rail is secured are narrow, the foreign matter entry preventing plates can be installed by inserting them from both end sides of the moving block. Thus, the installation operation is facilitated.

In the guide apparatus arranged as stated above, the foreign matter entry preventing plates each comprise a plate-shaped foreign matter entry preventing plate casing made of a material of high rigidity, and a plate-shaped foreign matter entry preventing plate body made of a flexible material. The foreign matter entry preventing plate body is fitted to one side end portion of the foreign matter entry preventing plate casing, and one side end surface of the foreign matter entry preventing plate body is brought into contact with one side surface of the track rail. Therefore, the foreign matter entry preventing plates are simple in arrangement and easy to install.

In the guide apparatus arranged as stated above, the foreign matter entry preventing plates each comprise a plate-shaped foreign matter entry preventing plate casing made of a material of high rigidity, a plate-shaped foreign matter entry preventing plate body made of a flexible material, and a foreign matter entry preventing plate retainer made of a material of high rigidity. The foreign matter entry preventing plate casing is secured to the end surface of one of the skirt portions on both sides of the moving block body in a state where one side end surface of the foreign matter entry preventing plate body is brought into contact with one side surface of the track rail and where the foreign matter entry preventing plate body is held between the foreign matter entry preventing plate retainer and the foreign matter entry preventing plate casing. Therefore, all the components constituting the foreign matter entry preventing plates have a simple plate-shaped configuration and hence become very easy to machine and less costly.

In the guide apparatus arranged as stated above, the foreign matter entry preventing plates have their respective side end surfaces perpendicularly contacting the opposite side surfaces of the track rail. Therefore, entry of foreign matter can be prevented even more effectively.

In the guide apparatus arranged as stated above, the foreign matter entry preventing plates have self-lubricating capability. Therefore, even if the side end surface of the foreign matter entry preventing plate body is brought into contact with the track rail side surface at a desired contact pressure, smooth relative movement of the track rail and the guide block is maintained.

EXPLANATION OF REFERENCE NUMERALS

11: track rail
12: rolling element rolling groove
20: moving block
21: moving block body
22: end plate
23: lubricator
24: end seal
25: laminated contact scraper
26: metal scraper
27: load rolling element rolling groove
28: skirt portion
29: rolling element relief bore
30: rolling element direction change passage
31: load rolling element rolling passage
32: rolling element (ball)
33: screw
34: foreign matter entry preventing plate
35: screw
36: foreign matter entry preventing plate body
37: foreign matter entry preventing plate casing
38: U-shaped groove
39: screw hole
40: U-shaped groove
42: screw hole
50: foreign matter entry preventing plate
51: foreign matter entry preventing plate casing
52: foreign matter entry preventing plate body
53: foreign matter entry preventing plate retainer
54: stepped portion
55: stepped portion
56: U-shaped groove
57: screw hole
58: screw hole

What is claimed is:
1. A guide apparatus including:
a track rail having rolling element rolling surfaces extending in a longitudinal direction thereof; and
a moving block relatively movably attached to said track rail, said moving block having an approximately U-shaped sectional configuration in a plane perpendicular to the longitudinal direction of said track rail, said moving block having skirt portions formed at both sides of an opening thereof and being mounted astride said track rail,
said moving block having:
a moving block body having load rolling element rolling surfaces that form load rolling element rolling passages in cooperation with said rolling element rolling surfaces, said moving block body further having rolling element relief bores associated with said load rolling element rolling surfaces; and
end plates mounted astride said track rail and secured to both ends of said moving block body in a direction of relative movement of said moving block, said end plates each having rolling element direction change passages that form rolling element recirculation passages in cooperation with said load rolling element rolling passages and said rolling element relief bores;
wherein a plurality of rolling elements are disposed in said rolling element recirculation passages so as to recirculate in response to relative movement of said track rail and said moving block;
said guide apparatus being characterized by comprising:
said moving block having a plurality of attachment devices mounted astride said track rail and attached to respective outer ends of said end plates in said direction of relative movement;
said attachment devices including lubricators, at least one of a set of end seals and a set of laminated contact scrapers, and outermost scrapers disposed outermost among said attachment devices in said direction of relative movement; and
foreign matter entry preventing plates provided so that their respective side end surfaces longitudinally contact opposite side surfaces of said track rail to close gaps between the side surfaces of said track rail and inner side surfaces of the skirt portions on both sides of said moving block body, inner side surfaces of said end plates and inner side surfaces of said attachment devices except said outermost scrapers;
said outermost scrapers having side surfaces perpendicular to the longitudinal direction of said track rail, said side surfaces being larger in size than respective side surfaces of said moving block body, said end plates and said attachment devices except said outermost scrapers that are perpendicular to the longitudinal direction of said track rail so that end portions of said foreign matter entry preventing plates can be attached to the side surfaces of said outermost scrapers;
said foreign matter entry preventing plates each having a length in the longitudinal direction of said track rail that is equal to a total of lengths of said moving block body and end plates in the longitudinal direction of said track rail and lengths of the attachment devices except said outermost scrapers in the longitudinal direction of said track rail;
opposite end surfaces of said foreign matter entry preventing plates in the longitudinal direction of said track rail being secured to the side surfaces of said outermost scrapers.

2. A guide apparatus according to claim 1, wherein said foreign matter entry preventing plates are secured to respective end surfaces of the skirt portions on both sides of said moving block body.

3. A guide apparatus according to claim 1, wherein outermost ones of said plurality of attachment devices are metal scrapers formed from metal plates.

4. A guide apparatus according to claim 1, wherein said foreign matter entry preventing plates each comprise:
- a plate-shaped foreign matter entry preventing plate casing made of a material of high rigidity; and
- a plate-shaped foreign matter entry preventing plate body made of a flexible material, said foreign matter entry preventing plate body being fitted to one side end portion of said foreign matter entry preventing plate casing;
- wherein one side end surface of said foreign matter entry preventing plate body is brought into contact with one side surface of said track rail.

5. A guide apparatus according to claim 1, wherein said foreign matter entry preventing plates each comprise:
- a plate-shaped foreign matter entry preventing plate casing made of a material of high rigidity;
- a plate-shaped foreign matter entry preventing plate body made of a flexible material; and
- a foreign matter entry preventing plate retainer made of a material of high rigidity;
- wherein said foreign matter entry preventing plate casing is secured to an end surface of one of the skirt portions on both sides of said moving block body in a state where one side end surface of said foreign matter entry preventing plate body is brought into contact with one side surface of said track rail and where said foreign matter entry preventing plate body is held between said foreign matter entry preventing plate retainer and said foreign matter entry preventing plate casing.

6. A guide apparatus according to claim 1, wherein said side end surfaces of said foreign matter entry preventing plates perpendicularly contact the opposite side surfaces of said track rail.

7. A guide apparatus according to claim 6, wherein said foreign matter entry preventing plates have self-lubricating capability.

* * * * *